United States Patent

Lomelino et al.

[11] Patent Number: 5,848,251
[45] Date of Patent: Dec. 8, 1998

[54] SECONDARY CHANNEL FOR COMMAND INFORMATION FOR FIBRE CHANNEL SYSTEM INTERFACE BUS

[75] Inventors: Lawrence W. Lomelino, Folsom, Calif.; Thomas W. Grieff, Spring; Michael L. Sabotta, Cypress, both of Tex.

[73] Assignee: Compaq Computer Corporation, Houston, Tex.

[21] Appl. No.: 692,516

[22] Filed: Aug. 6, 1996

[51] Int. Cl.[6] .................................................. G06F 13/14
[52] U.S. Cl. .......................... 395/309; 395/306; 395/825; 395/308
[58] Field of Search .................................... 395/280–281, 395/306–309, 825

[56] References Cited

U.S. PATENT DOCUMENTS

| | | | |
|---|---|---|---|
| 5,469,558 | 11/1995 | Lieberman et al. | 395/285 |
| 5,471,586 | 11/1995 | Sefidvash et al. | 395/284 |
| 5,574,945 | 11/1996 | Elko et al. | 395/825 |
| 5,590,286 | 12/1996 | Mehring et al. | 395/250 |
| 5,611,056 | 3/1997 | Hotchkin | 395/281 |

*Primary Examiner*—Meng-Ai T. An
*Assistant Examiner*—Sumati Lefkowitz
*Attorney, Agent, or Firm*—Jenkens & Gilchrist

[57] ABSTRACT

The present invention relates to a secondary channel for a point-to-point burst style bus associated with a computer system. The point-to-point bus may originate as a standardized bus from a fibre channel controller. The point-to-point bus connects to another circuit which may be a bridge circuit, a minicomputer or a peripheral device. A secondary channel is also connected to the point-to-point bus and is adapted to share the bus by receiving information having predetermined addresses. The information recieved by the secondary channel can be stored in a memory that is shared with a processor. Command/control information can be extracted from the point-to-point bus before data is transferred through the bridge circuit in order to allow the data to be acted on more quickly by processing/storage devices since the control data was already made available to the storage devices via the secondary channel.

11 Claims, 4 Drawing Sheets

SECONDARY CHANNEL FOR COMMAND INFORMATION FOR FIBRE CHANNEL SYSTEM INTERFACE BUS

BACKGROUND OF THE INVENTION

1. Field of the Invention

The present invention relates to a secondary channel connected to a point-to-point bus. The secondary channel is adapted to extract selected information from the point-to-point bus and provide the selected information to other circuits besides the point-to-point circuitry. More specifically, the present invention relates to the extraction of selected information from a Tachyon system interface bus and provide the selected information to a secondary circuit.

2. Description of Related Art

In recent years there have been major technological developments in the area of extremely fast data links. High performance computers have become the focus of the data communication industry. Performance requirements and improvements have spawned increasingly data-intensive and high-speed networking applications, such as multimedia, scientific visualization and extended network designs. However, existing network interconnects between computers and I/O devices have be unable to run at the needed speeds.

Fibre channels were created to provide a practical, inexpensive and expandable means for quickly transferring data between workstations, mainframes, super computers, desktop computers, storage devices, network servers and other peripherals. Fibre channel is the general name of an integrated set of standards developed by the American National Standards Institute (ANSI).

There are two basic types of data communication between processors and peripherals: channels and networks. A channel provides a direct or switched point-to-point connection between communication devices. A channel is typically hardware-intensive and transports data at high speed with low overhead. In contrast, a network is an aggregation of distributed nodes (like workstations, file servers or peripherals) with its own protocol that supports interaction among these nodes. A network has relatively high overhead since it is software-intensive and consequently slower than a channel.

Hewlett Packard, among other corporations, has designed an integrated circuit, called Tachyon, which interfaces with a fibre channel and operates as a controller. The Tachyon controller receives and transmits over a fibre channel. The Tachyon controller also provides a Tachyon system interface bus (TSI bus) for interfacing the Tachyon controller with high speed devices that can handle bursts of data. The TSI bus is basically a high speed point-to-point interconnect bus. It can be connected directly to a minicomputer or converted, via a bridge circuit, to other types of bus protocols such as that on a PCI bus.

Once on a PCI bus, data, that was received from the fibre channel, may be designated to be stored in a storage device via a SCSI controller. A local microprocessor may have to interpret the data stream present on the PCI bus and schedule a data transfer into a memory device such as a disk drive. After the data transfer is scheduled by the local microprocessor, then the SCSI controller will proceed to transfer data which originated from the fibre channel into a memory storage device.

A drawback of the above described technique for transferring data from a fibre channel to a, for example, storage device, is that it is time consuming to reformat the data information stream from a fibre channel format to a TSI bus format and then to a PCI bus format. A local microprocessor must read and interpret control commands that are present in the data and determine what should be done with the data that is now present on the PCI bus.

It would be useful for the control commands to be extracted from the TSI data stream at a time before the data is reformatted on to a PCI bus. This would enable the microprocessor to schedule a data transfer into, for example, a SCSI controller, at the same time the data stream is ready and available on the PCI bus.

SUMMARY OF THE INVENTION

The present invention relates to providing a secondary channel, connected to a point-to-point burst style bus, that is adapted to extract or provided predetermined information, such as control information, from or to the burst style bus. That is, the secondary channel shares a point-to-point bus with the two point-to-point devices.

More particularly, the present invention relates to a secondary channel for a point-to-point burst style bus associated with a computer system. The point-to-point bus may originate as a standardized bus from a fibre channel controller. The point-to-point bus connects to another circuit which may be a bridge circuit, a minicomputer or a peripheral device. A secondary channel is also connected to the point-to-point bus and is adapted to share the bus by receiving information having predetermined addresses. The information recieved by the secondary channel can be stored in a memory that is shared with a processor.

BRIEF DESCRIPTION OF THE DRAWINGS

Objects and advantages of this invention will become apparent and more readily appreciated from the following Detailed Description taken in conjunction with the accompanying drawings of which.

DETAILED DESCRIPTION OF THE EXEMPLARY EMBODIMENTS OF THE PRESENT INVENTION

Figure 1:
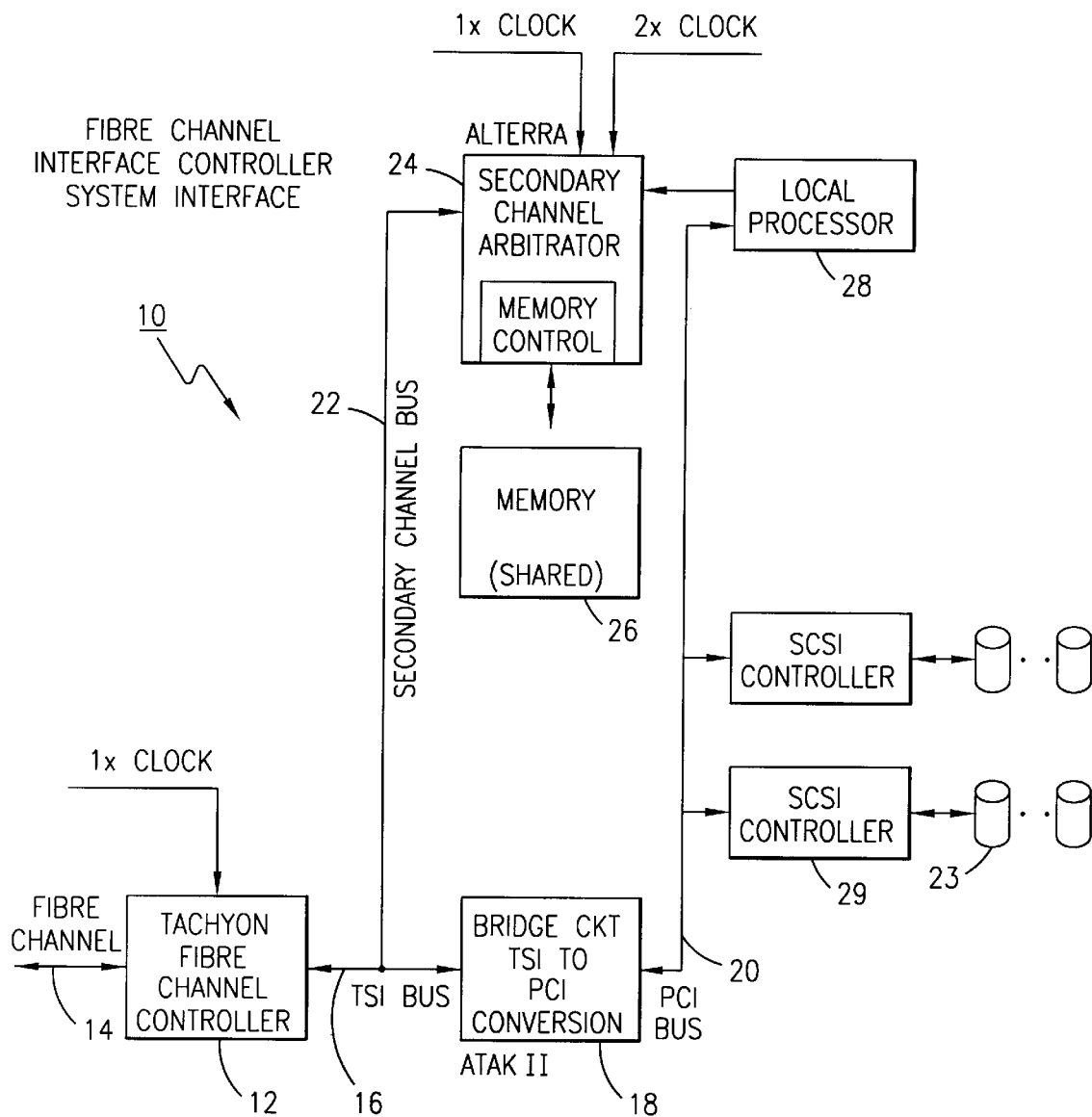
FIG. 1 is a block diagram of an exemplary embodiment of the present secondary channel for a fibre channel interface controller interface bus.

Referring to FIG. 1, the exemplary embodiment of the present secondary channel for a fibre channel interface controller system interface bus 10 preferably requires a fibre channel controller 12 such as a Tachyon controller. Other fibre channel controllers could be used without departing from the sprit of the present invention. The Tachyon controller 12 is adapted to receive and transmit information via a fibre channel 14. The Tachyon controller 12 converts the fibre channel information to a standardized bus protocol referred to as a TSI bus 16. The preferred Tachyon controller 12 is manufactured by Hewlett Packard and the specification therefore is hereby incorporated by reference.

The TSI bus 16 is preferably converted by a "bridge circuit" 18 to a standardized bus protocol for a PCI bus 20. Furthermore, a secondary channel bus 22 is connected to the TSI bus 16. The data on the TSI bus 16 is being clocked at preferably 33 MHZ. The TSI bus 16 is a high speed data burst bus which cannot be slowed down or sped up. The TSI bus 16 was designed to be a point-to-point bus so that data can be sent from the fibre channel controller 12 to another device at a high data rate. The fibre channel controller 12 passes at least two types of information onto the TSI bus 16: 1) data, which may have to be stored on a disk 23; and 2) control information which defines, for example, what is to be done with the data.

The secondary channel bus 22 is connected to a secondary channel bus arbitrator 24. As a result, the fibre channel controller 12, the bridge circuit 18, and the secondary channel bus arbitrator 24 are all connected via the TSI bus. The secondary channel bus arbitrator 24 is connected via a bus to a memory circuit 26. The memory circuit 26 is preferably SRAM that can operate at a minimum clock rate of 66 MHz. Other memory circuitry could be utilized in the present invention, but the memory must be able to be clocked at a minimum of 66 MHz. A local processor 28 is connected to the memory 26. The PCI bus 20 is connected to the local processor and to other peripheral devices such at SCSI controllers 29 and cache memories.

The operation of the preferred embodiment of the present secondary channel for a fibre channel controller system interface bus 10 is straight forward. The goal of the exemplary embodiment is increase the speed at which data can be retrieved or provided to a fibre interface. In other words, the present invention is designed to bypass the intermediate transfer stage (the bridge circuit 18) of control information and thereby increase the speed that data can be directed to a designated device (such as a disk 23).

Figure 2:
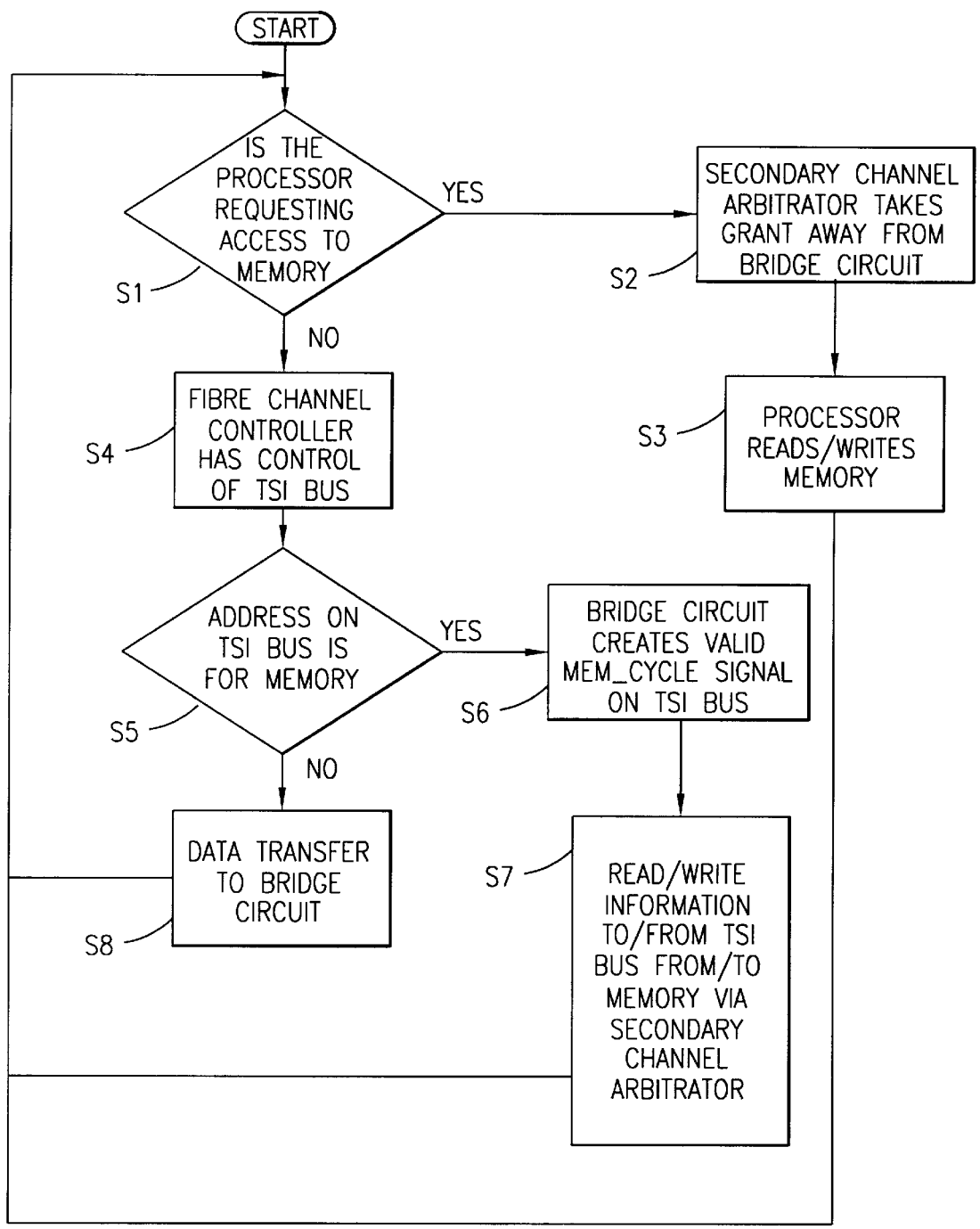
FIG. 2 depicts a flow chart indicating the basic operation of the exemplary secondary channel.

FIG. 2 depicts a flow chart indicating how the exemplary secondary channel 10 operates. At S1 it is determined whether the local processor 28 is requesting to read or write to the memory 26. If the local processor 28 is requesting to read or write to or from the memory 26, the secondary channel bus arbitrator 24 requires that the bridge circuit 18 does not have a grant (control) of the TSI bus 16 S2. The local processor 28 will provide an address and information to the secondary channel bus arbitrator 24 and the secondary channel bus arbitrator 24 will clock the information into the memory 26 S3.

If the local processor 28 is not requesting access to the memory 26 then the fibre channel controller 12 takes control of the TSI bus 16 S4.

The fibre channel controller 12 provides addresses and information to the TSI bus 16 S5. When control information is to be sent from the TSI 16 bus to the memory 26, the fibre channel controller 12, on a first cycle, places an ADDRESS VALID CHIP SELECT signal and an ADDRESS on the TSI bus 16. These signals are clocked into the bridge circuit 18 and stored in latches (not shown) so the address can be sent at a later time to the memory if necessary.

On a second cycle the bridge circuit 18 determines if the ADDRESS is an address for the memory 26 or an address for the bridge circuit 18. If the ADDRESS is for the memory 26 then the bridge circuit 18 places a VALID MEM__CYCLE signal on the TSI bus 16 indicating that the information following the address is to be stored in the memory 26 S6. The secondary channel arbitrator 24 notices the VALID MEM__CYCLE on the TSI bus 16 and allows information following the address to be sent directly to the memory 26 S8. If there is not a VALID MEM__CYCLE signal provided by the bridge circuit 18 then the information following the address is sent through the bridge circuit 18 and transformed to the PCI protocol S8. In the preferred embodiment of the present invention control information is sent directly from the TSI bus 16 to the memory 26 and data information is transformed, via the bridge circuit 18, to the PCI protocol and then clocked onto the PCI bus 20.

Note that the address and control information could both be transformed to a PCI protocol via the bridge circuit 18 and then placed on the PCI bus 20. Once on the PCI bus 20 the information could be placed in the memory 26 or provided to the local processor 28 or other devices on the PCI bus. The process of transforming the address and information to a PCI protocol takes additional clock cycles not required in the present invention. Thus, the present invention provides control information to the local processor 28 via the memory more quickly because the control information is extracted from the TSI bus prior to any transformation to the PCI protocol.

Thus, the local processor 28 can determine where information related to the control signal (usually data following the control signal) should go more quickly because the control information is available to the local processor 28 quite a few cycles before the data coming from the TSI bus 16 is being transformed by the bridge circuit 18 and placed on the PCI bus 20.

The present exemplary embodiment requires the fibre channel controller 12 to be set up to provide and control a TSI bus 16, the bridge circuit 18 to be connected to the TSI bus 16 and set up to determine if the information on the TSI bus is to go to the PCI bus 20 or to the memory 26, and the secondary channel arbitrator 24 be set up to receive information having addresses designating the information to go to memory 26.

Furthermore, the exemplary embodiment of the present invention may include a local processor 28 that can read and write information from and to the memory 26 without interfering with the TSI bus 16 and information coming from the TSI bus 16 designated for memory.

The memory 26 is, in essence, shared between the TSI bus 16 and the local processor 28. Furthermore, the memory 26 is clocked preferably at a speed which is twice as fast at the clock rate of the TSI bus 16. For example, if the TSI bus 16 is operating at a clock rate of 33 MHz, then the memory 26 is being clocked synchronously at 66 MHz. As long at the memory 26 is clocked at a speed which is a multiple of the clock speed of the TSI bus, then there can be time (at least a half a 33 MHz clock cycle) to decode an address on the TSI bus 16 and determine whether information following the address is to go to the memory 26 or to the bridge circuit 18 and onto the PCI bus 20.

The present invention allows a point-to point bus, such as a TSI bus, to be shared. Without the present invention, all information coming from the fibre channel controller 12 would have to go to the TSI bus 16 and then to the bridge circuit 18 where it would be converted to another protocol such as PCI.

The present invention allows a point-to-point bus to be more than a point-to-point bus. The advantage is that predetermined types of information, such as control signals, can be extracted from the point-to-point bus and used by other circuitry while other information, such as data, can continue on the TSI bus 16 and thereby be acted on more quickly by other circuitry, such as a local processor, because the other circuitry has already received the control signals associated with the data.

Figure 3:
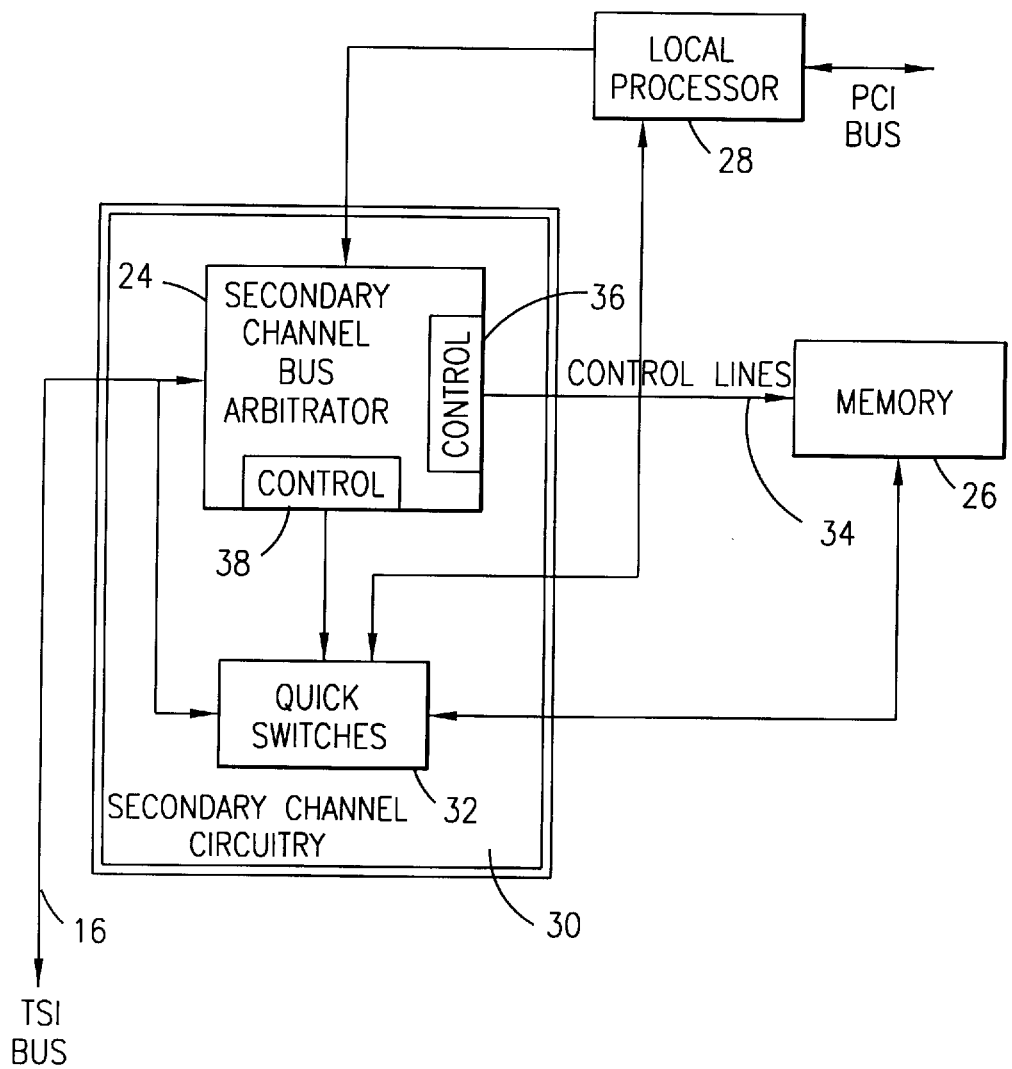
FIG. 3 depicts a block diagram of a portion of an embodiment of the secondary channel.

FIG. 3 depicts a block diagram of a portion of the present invention. The TSI bus 16 is connected to the secondary channel circuitry 30. The secondary channel circuitry 30, in this embodiment, has two basic blocks: 1) the secondary bus arbitrator 24; and 2) quick switches 32. The secondary channel bus arbitrator 24 receives control signals from the bridge circuit (not shown) via the TSI bus 16. In response to the control signals from the bridge circuit, the secondary channel bus arbitrator 24 instructs the quick switches 32 to switch the TSI bus 16 so that: a) the TSI bus can provide or be provided information to or from the memory; or b) the local processor can provide or be provided information to or from the memory.

On the first half clock cycle, the bridge circuit determines were an address, received from the TSI bus 16, is to go. If the address is for the memory, the bridge circuit provides a signal, via the TSI bus 16, to the secondary channel circuitry 30. Within the secondary channel circuitry 30, the memory is addressed via the control lines 34 while the information to be sent to memory 26 is switched via the quick switches 32 and send to the memory 26 for storage. The TSI bus 16 is clocked at approximately 33 MHz. In order to be able to decode the address on the TSI bus 16 and control the memory 26 fast enough to handle a burst of data from the TSI bus 16 (i.e. in essentially real time) the control circuitry for the quick switches 38 and the memory 36 must be clocked synchronously at two times the frequency of the TSI bus clock which is approximately 66 MHz. This will allow one full clock cycle for each half TSI clock cycle. During the first half of the TSI clock, the address is decoded and during the second half of the clock cycle the secondary channel circuitry 30 can operate to have data read or written into or out of the memory. When the TSI bus 16 is not addressing the memory 26, the local processor 28 can address the memory 26 and read or write information.

Figure 4:
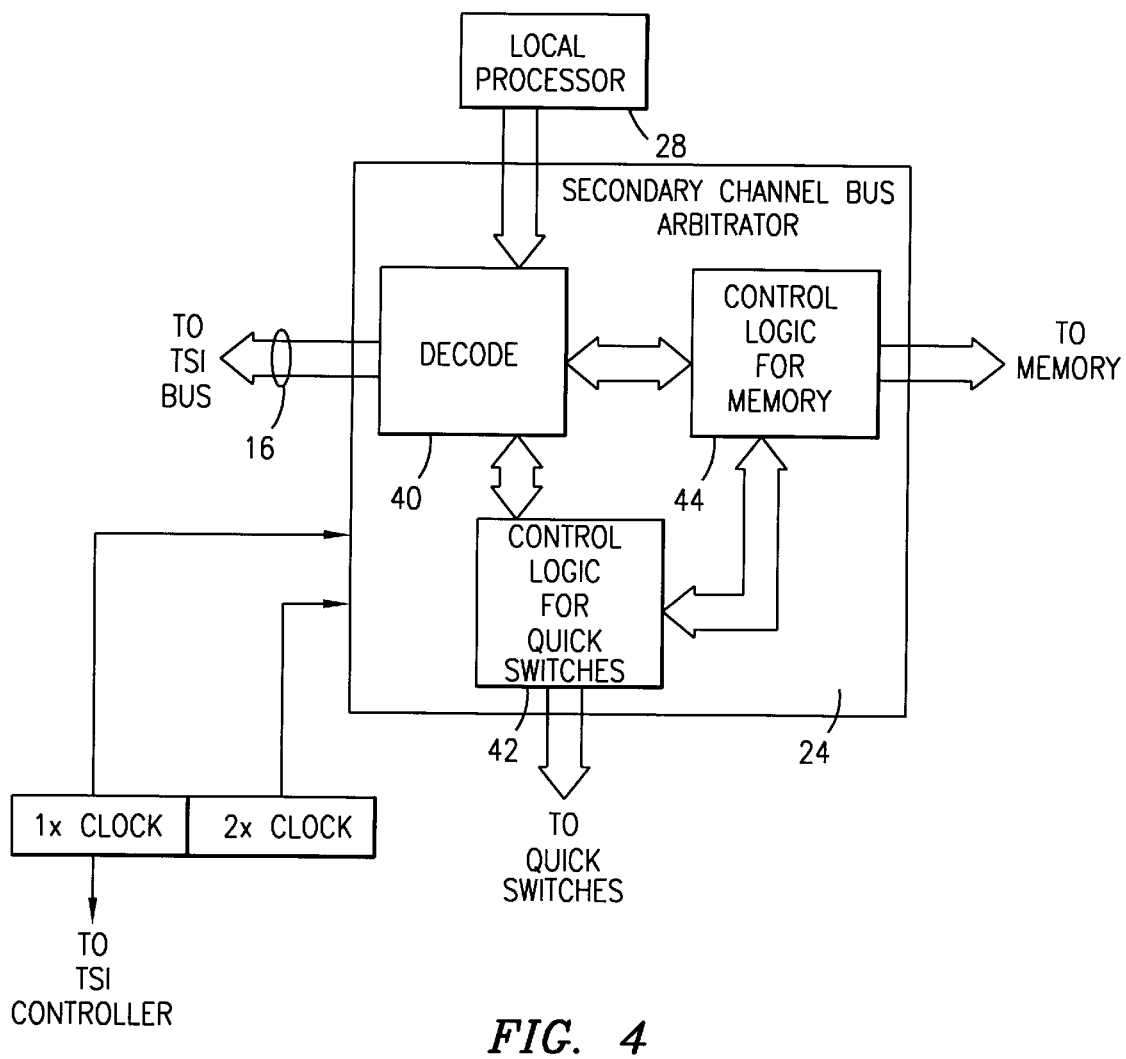
FIG. 4 depicts a block diagram of an exemplary secondary bus arbitrator.

FIG. 4 depicts a block diagram of an exemplary secondary channel bus arbitrator 24. The secondary bus arbitrator 24 receives selected signals from the TSI bus 16. These signals are decoded in a decode circuit. The decode circuit 40 also receives signals from the local processor 28. In essence the decode circuit determines whether the TSI bus 16 or the local processor 28 or neither are requesting to read or write the memory 26. Based on the determination of the decode circuit 40, the control logic for the quick switches 42 and the control logic for the memory 44 are triggered to either allow the TSI bus 16 to read or write the memory 26, or to allow the local processor 28 to read or write the memory 26.

As is clearly seen, the present invention is a significant improvement in the art because it enables selected control information to be received by a memory circuit and read by a local processor in a more timely manner. Also, a memory circuit is shared by a bursting point-to-point bus and a local processor. Furthermore, selected control information may bypass the intermediate transfer and reformatting of the bridge circuit. The present invention is believed to be especially effective when configured and employed as described herein, however, those skilled in the art will readily recognize that numerous variations and substitutions may be made in the invention and its use and configuration to achieve substantially the same results as achieved by the embodiments expressly described herein. Each of the variations is intended to be included in the description herein and forms a part of the present invention. The foregoing detailed description is, thus, to be clearly understood as being given by way of illustration and example only, the spirit and scope of the present invention being limited by appended claims.

What is claimed is:

1. A computer system having a fibre channel system interface apparatus for communicating information from a fibre channel system interface bus, such that control command information is separated from data stream information and available for processing in advance of data stream information, said fibre channel system interface comprising:

a first circuit connected to said system interface bus for determining if an information on said system interface bus is at least one of a control command for controlling a storage device and a data stream for storage in said storage device;

a second circuit connected to said system interface bus for directing said control command to a memory circuit if said first circuit determines that said information is designated for controlling said storage device, said first circuit transforms said data stream from a first format to a second format and then places the transformed data stream onto a secondary bus, said secondary bus being connected to said storage device.

2. The computer system having a fibre channel interface of claim 1, further comprising a processor, said processor being adapted to access said memory circuit when said second circuit has determined that said system interface bus does not have an information designated for controlling said storage device.

3. The computer system having a fibre channel interface of claim 2, wherein said processor accesses said memory circuit via said second circuit.

4. The computer system having a fibre channel interface of claim 1, wherein said system interface bus is clocked at a first frequency and said memory circuit is clocked at a second frequency that is both synchronous with said first frequency and a multiple of said first frequency.

5. The computer system having a fibre channel interface of claim 1, wherein said system interface bus is a Tachyon System Interface (TSI) bus.

6. The computer system having a fibre channel interface of claim 5, wherein said first circuit is a Tachyon System Interface (TSI) bus to PCI bus bridge circuit.

7. The computer system having a fibre channel interface of claim 1, wherein said system interface bus is a Tachyon System Interface (TSI) bus that originates from a Tachyon circuit, said tachyon circuit being connected to a fibre channel bus.

8. The computer system having a fibre channel interface of claim 1, wherein said system interface bus originates from a fibre channel controller circuit.

9. A computer system having a fibre channel interface system, said fiber channel interface system comprising:

a fibre channel controller for receiving electronic information from a fibre channel and for placing said electronic information on a system interface bus;

a bridge circuit connected to said system interface bus, said bridge circuit determining whether said electronic information is at least one of data and a control command and extracting said control command from said electronic information;

a secondary channel connected to said system interface bus, said secondary channel being for receiving said control command, processing said control command and informing one of a plurality of controller circuits that data from said bridge circuit is imminent in at least one clock cycle.

10. The computer system of claim 9, having a fibre channel interface system, wherein said bridge circuit transforms said data from a first format to a PCI bus format.

11. The computer system of claim 9, having a fibre channel interface system, wherein said secondary channel comprises a secondary channel arbitrator and a local processor for receiving and processing said control command.

* * * * *